R. D. SIMPSON.
METER CONNECTION.
APPLICATION FILED SEPT. 4, 1917.

1,284,160.

Patented Nov. 5, 1918.

Witness
Inventor
Robert D. Simpson
By
Attorney

UNITED STATES PATENT OFFICE.

ROBERT D. SIMPSON, OF COLUMBUS, OHIO, ASSIGNOR, BY MESNE ASSIGNMENTS, TO THE COLUMBUS STEEL PRODUCTS COMPANY, OF COLUMBUS, OHIO, A CORPORATION OF OHIO.

METER CONNECTION.

1,284,160.  Specification of Letters Patent.  Patented Nov. 5, 1918.

Application filed September 4, 1917. Serial No. 189,443.

*To all whom it may concern:*

Be it known that I, ROBERT D. SIMPSON, a citizen of the United States, residing at Columbus, in the county of Franklin and State of Ohio, have invented certain new and useful Improvements in Meter Connections, of which the following is a specification.

This invention relates to meter connections for properly holding a meter in its applied position. The invention is particularly adapted to the mounting of gas meters, but it is to be understood that it is not specifically limited thereto.

One of the objects of my invention resides in a structure which will give adjustments of various forms and which may be stated as being practically universally adjustable to adapt itself to various irregularities in meters. It will be understood that the inlet and outlet connections of a gas meter are not always in proper alinement, these distortions taking various forms and it is to this end that my invention readily adapts itself.

Figure 1:
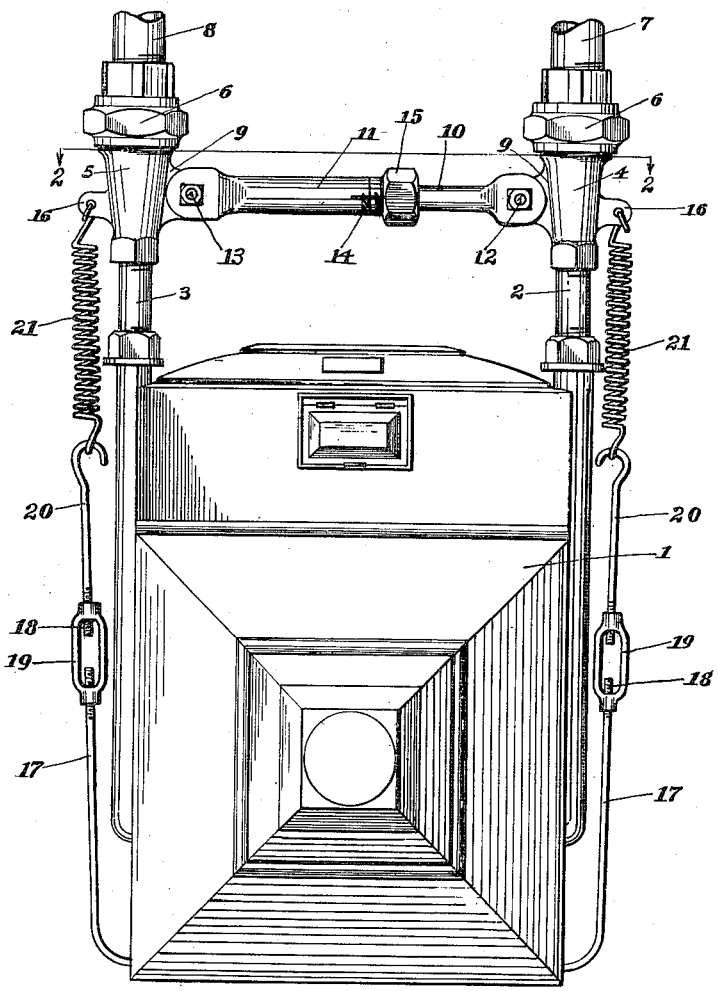
Figure 2:
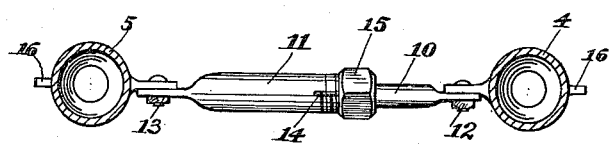

The preferred embodiment of my invention is shown in the accompanying sheet of drawings, in which similar characters of reference designate corresponding parts, and in which:

Figure 1 is a view in side elevation of a gas meter with my improvements applied thereto, and, Fig. 2 is a section taken on line 2—2 of Fig. 1.

In Fig. 1, the gas meter as a whole is designated by the reference numeral 1 and is shown as being provided with the conventional type of inlet and outlet pipes 2 and 3. It is to these connections that the attachment is secured, this attachment taking the form of suitable fittings 4 and 5 respectively. The top of each of the fittings 4 and 5 is provided with a union 6, so that a ready connection with the intake and outlet pipes 7 and 8 may be made. Each of the fittings 4 and 5 is provided with a laterally projecting ear 9, which is pierced to form a pivotal connection with the proper sections 10 and 11 forming a transverse connection between the fittings 4 and 5. The section 10 is shown as being pivotally mounted on the fitting 4 at 12 and comprises a rod flattened at one end as shown. This rod is designed to telescope within the pipe section 11 which is also flattened at its outer end and is pivotally connected to the ear 9, as is shown at 13. The opposite end of the pipe section 11 is slotted as shown at 14 and also threaded to accommodate the nut 15. This external thread is of the conventional pipe thread size, whereby when the nut 15 is screwed thereon, the portions formed by the slots 14 will be caused to contract to securely lock themselves onto the section 10 to hold the latter in its position of adjustment.

From the description thus far given, it will be apparent that the transverse connection between the fittings 4 and 5 is adjustable as to length and the two sections 10 and 11 are also capable of a relative twisting adjustment about their longitudinal axes. Thus, if the inlet and outlet connections 2 and 3 should lie in separate planes or, in other words, be slightly offset, this may be compensated for by the loose pivotal connections 12 and 13. Also, should they not be in parallelism, this is further taken care of by the pivotal connections 12 and 13 and also, should there exist a slight twist with regard to the inlet and outlet pipes, this will be taken care of by the twisting capability of the two sections 10 and 11 with respect to each other.

Each of the fittings 4 and 5 is provided with a second pierced ear 16 which forms the means of supporting the shelf structure now to be described. In the present embodiment this shelf support is shown as being a rod 17 bent to U-shape as is shown, to fit the underside of the meter and threaded at its two ends as shown at 18. Turn buckles 19 are threaded on to this U-shaped support and also carry hooked rods 20 at their opposite ends. These hooked rods in turn are secured to springs 21 which latter are also secured to the pierced ears 16. By means of the springs, the shelf supporting structure may be drawn tightly against the underside of a meter and inasmuch as these springs are supported from the fittings 4 and 5, the strain on the inlet and outlet pipes carried by the meter itself is materially relieved. Further, the tension of these springs 21 may be varied at will whence they may be made to exert like pulls by adjusting the turn buckles 19 to their proper position.

From the foregoing description, it will appear that I have provided a structure which very readily takes care of any inequalities or imperfections in a meter of the type referred to and also one wherein the supporting strain of this meter is relieved to a very material extent. This latter is effected by means of the spring supported shelf supporting structure.

What I claim is:

1. A meter supporting connection comprising supporting fittings attached to the inlet and outlet of a meter, a transverse connection between said fittings, and means carried by each of said fittings for pivotal connection with the ends of said connection, said connection being formed in sections which are connected to each other to be capable of a relative twist about their longitudinal axis.

2. A meter supporting connection comprising supporting fittings attached to the inlet and outlet of a meter, a transverse connection between said fittings, means carried by each of said fittings for pivotal connection with the ends of said connection, said connection being formed in sections which are connected to each other to be adjustable longitudinally and capable of a relative twist about their longitudinal axis, and means for locking said sections against either longitudinal or a twistable adjustment.

3. A meter supporting connection comprising supporting fittings attached to the inlet and outlet of a meter, a transverse connection between said fittings formed of telescoping sections, means carried by each of said fittings for pivotal connection with one end respectively of said sections, and means for locking said sections in any position of adjustment.

4. A meter supporting connection comprising supporting fittings attached to the inlet and outlet of a meter, a transverse connection between said fittings comprising a pipe section, a second section slidable within said pipe section and capable of a twisting movement within said pipe section, means carried by said fittings for pivotal connection with one end respectively of said sections, and means for locking said sections in any position of combined twisting and longitudinal adjustment.

In testimony whereof I affix my signature in presence of two witnesses.

ROBERT D. SIMPSON.

Witnesses:
WALTER E. L. BOCK,
A. L. PHELPS.